No. 640,894. Patented Jan. 9, 1900.
T. FISHER.
HOG TRAP.
(Application filed July 25, 1899.)
(No Model.) 2 Sheets—Sheet 1.

Witnesses
Howard D. Orr.
H. J. Riley

Terry Fisher, Inventor,
By his Attorneys,
C. A. Snow & Co.

THE NORRIS PETERS CO., PHOTO-LITHO., WASHINGTON, D. C.

No. 640,894. Patented Jan. 9, 1900.
T. FISHER.
HOG TRAP.
(Application filed July 25, 1899.)
(No Model.) 2 Sheets—Sheet 2.

Witnesses
Howard D. Orr.
H. H. Riley

Terry Fisher, Inventor,
By his Attorneys,
C. A. Snow & Co.

THE NORRIS PETERS CO., PHOTO-LITHO., WASHINGTON, D. C.

UNITED STATES PATENT OFFICE.

TERRY FISHER, OF MEXICO, INDIANA.

HOG-TRAP.

SPECIFICATION forming part of Letters Patent No. 640,894, dated January 9, 1900.

Application filed July 25, 1899. Serial No. 725,101. (No model.)

*To all whom it may concern:*

Be it known that I, TERRY FISHER, a citizen of the United States, residing at Mexico, in the county of Miami and State of Indiana, have invented a new and useful Hog-Trap, of which the following is a specification.

The invention relates to improvements in hog-traps.

The object of the present invention is to improve the construction of hog-traps and to provide a simple and comparatively inexpensive device capable of securely holding a hog while ringing or otherwise operating on it and adapted to be quickly operated to release a hog and permit the same to escape from it.

The invention consists in the construction and novel combination and arrangement of parts, hereinafter fully described, illustrated in the accompanying drawings, and pointed out in the claims hereto appended.

Figure 1:
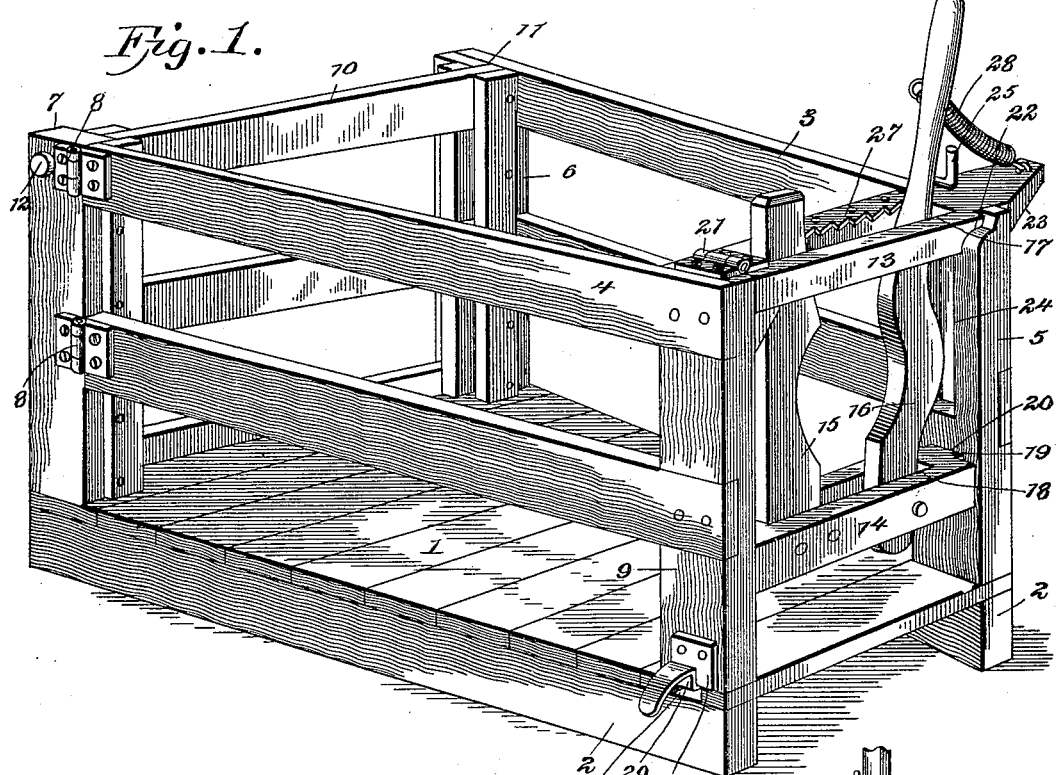
Figure 2:
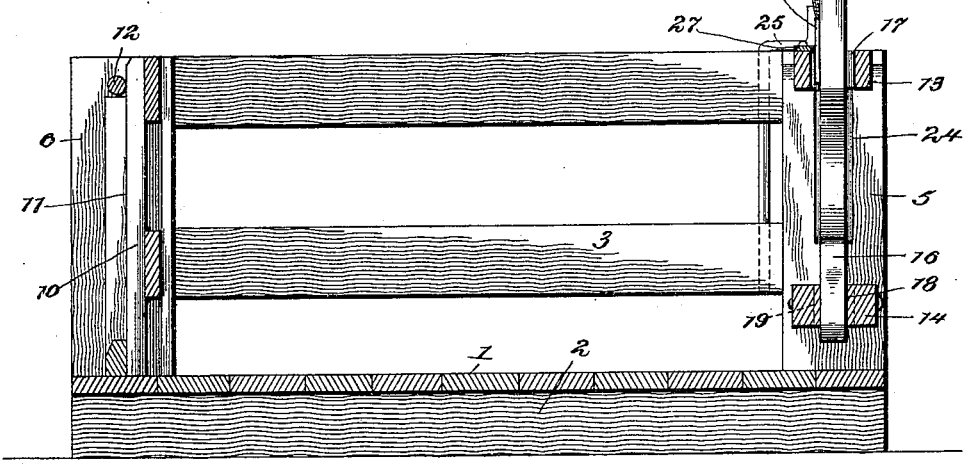
Figure 3:
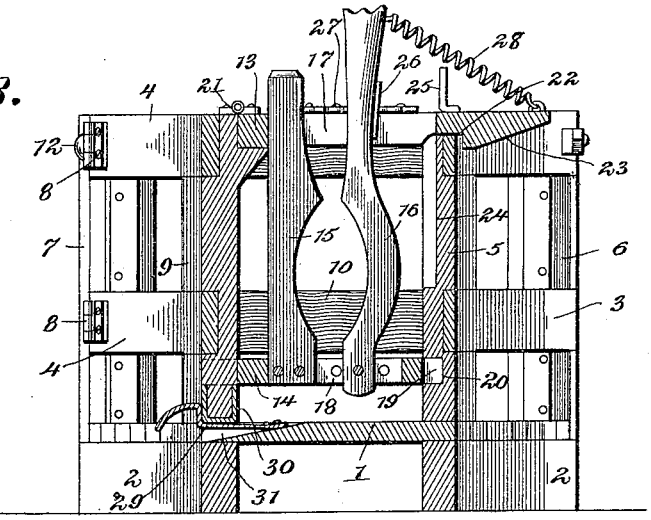
Figure 4:
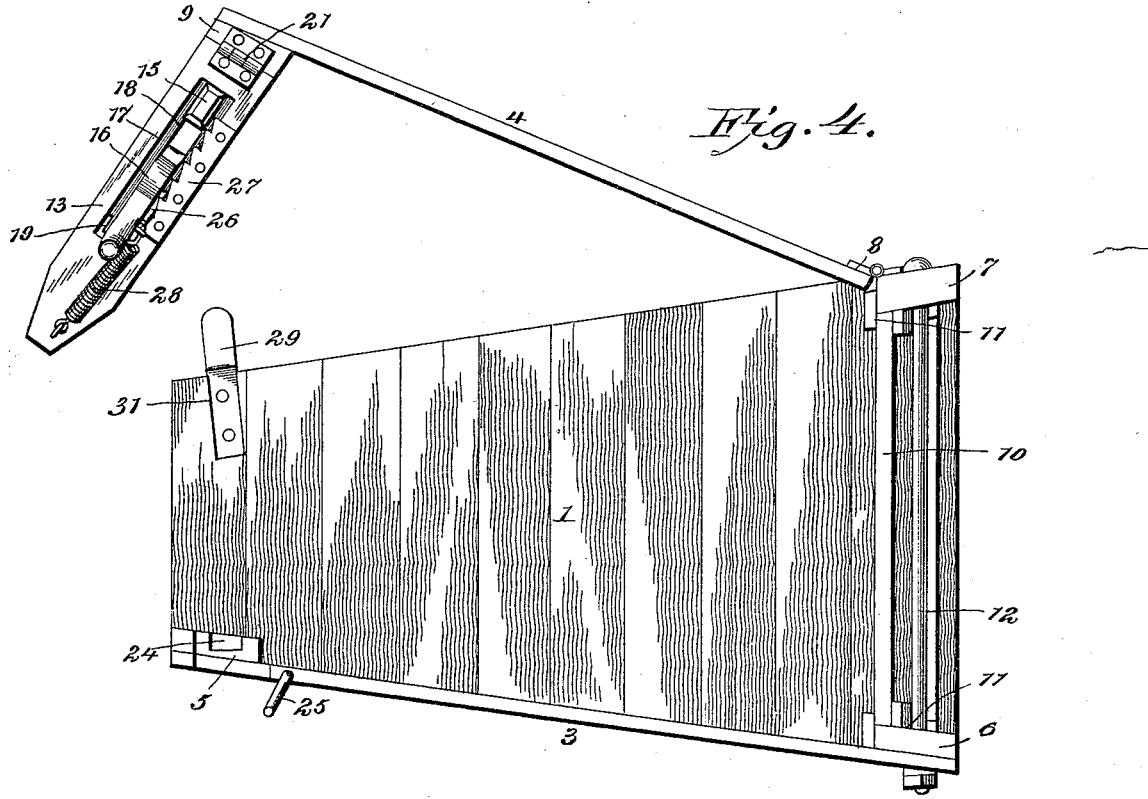

In the drawings, Figure 1 is a perspective view of a hog-trap constructed in accordance with this invention. Fig. 2 is a longitudinal sectional view. Fig. 3 is a transverse sectional view. Fig. 4 is a plan view, the parts being arranged for releasing an animal.

Like numerals of reference designate corresponding parts in all the figures of the drawings.

1 designates a platform or floor mounted upon side sills 2, and arranged at the side edges of the floor or platform are stationary and swinging sides 3 and 4 of the frame of the trap. The stationary side 3 is composed of horizontal bars secured to front and rear posts 5 and 6, and the movable side, which is provided with horizontal bars, is connected with a rear post 7 by hinges 8 and carries a front post 9 and also the front of the trap with the holding device, hereinafter described, whereby after the operation on a hog has been completed the parts may be arranged, as illustrated in Fig. 4 of the accompanying drawings, to permit the animal to escape.

The back 10 of the trap consists of a vertically-sliding gate mounted in vertical ways 11, consisting of cleats or bars secured to the inner faces of the rear posts 6 and 7 of the frame of the trap. The rear corner-posts are braced at the top by a transverse rod 12, and the sliding gate or door, which forms the back of the trap, is adapted to be raised to permit the entrance of a hog, which is driven into the trap at the back thereof.

The front of the trap is composed of upper and lower horizontal bars 13 and 14, a vertical bar 15, forming one of the jaws of the holding device, and a lever 16, forming the other jaw of the holding device, and the inner engaging edges of the parts 15 and 16 are concavely curved, as shown, to conform to the general configuration of the neck of an animal. The upper and lower bars 13 and 14 are provided with longitudinal slots 17 and 18 to receive the parts 15 and 16, and the lower bar 14 is provided with a tongue or tenon 19, which fits in a mortise or socket 20 of the stationary front corner-post 5 of the frame of the trap. The upper bar 13 is connected to the hinged side 4 of the frame by a hinge 21 and is adapted to be swung upward to disengage it from the stationary side of the frame. The engaging end of the top bar is provided with a recess 22 at its lower face to engage the upper edge of the stationary side of the frame, and it is beveled at 23 beyond the recess 22 to enable it to be readily engaged with the stationary side of the frame.

The stationary front post 6 is provided above the mortise or socket 20 with a vertical recess 24, adapted to receive the lever when the same is swung outward to the limit of its movement, and the upper bar 13 is retained in engagement with the corner-post by means of a movable catch 25, mounted on the stationary side of the frame and adapted to be swung over the bar 13, as clearly illustrated in Fig. 2 of the accompanying drawings. The catch consists of a rod or pivot journaled on the stationary side of the frame and provided at its upper end with a substantially L-shaped arm, forming an engaging portion and providing an upwardly-extending handle or grip adapted to be readily grasped by the operator to manipulate it.

When the head of an animal extends through the space or opening between the bar 15 and the lever 16, the latter is moved inward against the neck of the animal, which is securely held while it is being operated on for the usual well-known purposes, and after the operation has been completed the lever is swung outward to permit the hog to withdraw its head, and the movable side is then opened, as illustrated in Fig. 4, to permit the animal to escape. The lever is provided at its inner face with a flange 26, preferably consisting of a plate and arranged to engage teeth of a horizontal ratchet 27, mounted upon the upper face of the bar 13 and projecting inward over the slot 17 from the inner wall thereof. The lever is held in engagement with the ratchet by means of a coiled spring 28, connected with the upper portion of the lever and with the outer portion of the bar 13, which projects beyond the stationary side 3 of the trap. The ratchet holds the lever against outward movement, and the spiral spring retains the said lever firmly in engagement with the ratchet.

The hinged side of the trap is further held closed by means of a bottom catch 29, consisting of a spring mounted in a recess of the floor or platform of the trap and provided between its ends with a shoulder arranged to engage the lower end of the corner-post 9, as clearly illustrated in Fig. 3 of the accompanying drawings, and the outer portion of the catch projects beyond the trap and is adapted to be engaged by the foot of the operator, whereby it is depressed to release the movable side 4. The post 9 is preferably provided at its lower end with a wear-plate 30, which is U-shaped and which is arranged on the lower edge and the outer face of the said post. The outer projecting portion of the catch is arranged at a slight inclination, and the movable portion when swung inward locks automatically. The inner portion of the spring is perforated for the reception of screws and other suitable fastening devices, and the outer portion of the recess 31 is of sufficient depth to permit the shoulder of the catch to be readily disengaged from the movable side of the trap.

It will be seen that the trap is simple and comparatively inexpensive in construction, that it is easily operated to engage and release an animal, and that it is capable of firmly holding the same while operating on it. The movable side of the frame swings horizontally, and it is readily released to permit it to swing outward, and it locks automatically when it is swung inward.

Changes in the form, proportion, size, and the minor details of construction within the scope of the appended claims may be resorted to without departing from the spirit or sacrificing any of the advantages of this invention.

What is claimed is—

1. A device of the class described comprising a stationary side, a movable side hinged at its rear end on a vertical axis, a front carried by the movable side, the latter being adapted to swing horizontally to open and close the front of the device, and a holding device mounted on the front and adapted to engage a hog, substantially as described.

2. A device of the class described comprising a stationary side, a movable side hinged at its rear end on a vertical axis, a front portion provided with a holding device and engaging the upper portion of the stationary side, said front portion being carried by the movable side and the latter being adapted to swing horizontally to open and close the front of the hog-trap and a catch mounted on a fixed portion of the device and engaging the movable side at the bottom thereof and arranged to be operated by the foot of a person, substantially as described.

3. A device of the class described comprising a stationary side, a movable side arranged to swing horizontally, upper and lower bars arranged at the front of the trap and carried by the movable side, the upper bar being hinged and engaging the upper edge of the stationary side, and a holding device carried by the upper and lower bars, substantially as described.

4. A device of the class described comprising a stationary side, a movable side arranged to swing horizontally, the upper and lower slotted bars 13 and 14, the lower bar being interlocked with the stationary side and the upper bar being hinged and detachably engaging the said stationary side, the vertical bar 15 arranged in the slots of the upper and lower bars and secured to the lower one, a clamping-lever arranged in the said slots and fulcrumed on the lower bar, a ratchet mounted on the upper bar and arranged to be engaged by the lever, and a coiled spring connected with the lever and with the outer portion of the upper bar, substantially as described.

5. A device of the class described comprising a stationary side, a movable side arranged to swing horizontally, an upper bar hinged to the movable side at one end and provided at its other end with means for engaging the stationary side, a pivoted fastening device mounted on the latter and engaging the upper bar, and means for holding an animal, substantially as described.

In testimony that I claim the foregoing as my own I have hereto affixed my signature in the presence of two witnesses.

TERRY FISHER.

Witnesses:
CHESTER KNOUSE,
ELMER S. MORRIS.